(12) United States Patent
Guercioni

(10) Patent No.: US 9,520,762 B2
(45) Date of Patent: Dec. 13, 2016

(54) METHOD AND FIXTURE FOR TWISTING END PORTIONS OF BAR CONDUCTORS, IN PARTICULAR FOR BAR WINDINGS OF ELECTRIC MACHINES

(71) Applicant: TECNOMATIC S.P.A., Teramo (IT)

(72) Inventor: Sante Guercioni, Teramo (IT)

(73) Assignee: TECNOMATIC S.p.A., Teramo (IT)

( * ) Notice: Subject to any disclaimer, the term of this patent is extended or adjusted under 35 U.S.C. 154(b) by 88 days.

(21) Appl. No.: 14/269,966

(22) Filed: May 5, 2014

(65) Prior Publication Data
US 2014/0237811 A1    Aug. 28, 2014

Related U.S. Application Data

(62) Division of application No. 13/387,734, filed as application No. PCT/IT2011/000004 on Jan. 4, 2011, now Pat. No. 8,826,513.

(51) Int. Cl.
*H02K 15/04* (2006.01)
*H02K 15/00* (2006.01)

(52) U.S. Cl.
CPC ...... *H02K 15/0435* (2013.01); *H02K 15/0031* (2013.01); *H02K 15/04* (2013.01); *H02K 15/0428* (2013.01); *Y10T 29/49009* (2015.01); *Y10T 29/49012* (2015.01); *Y10T 29/53143* (2015.01); *Y10T 29/53161* (2015.01); *Y10T 29/53687* (2015.01)

(58) Field of Classification Search
CPC  H02K 15/0031; H02K 15/0428; H02K 15/04; H02K 15/0435; Y10T 29/49009
See application file for complete search history.

(56) References Cited

U.S. PATENT DOCUMENTS

| | | | |
|---|---|---|---|
| 4,358,099 A | 11/1982 | Hamane et al. | |
| 4,945,631 A * | 8/1990 | Banner | H01R 43/06 29/598 |
| 5,454,156 A | 10/1995 | Morr | |
| 6,640,421 B2 | 11/2003 | Katsuzawa et al. | |
| 7,480,987 B1 | 1/2009 | Guercioni | |
| 7,721,413 B2 * | 5/2010 | Guercioni | H02K 15/064 29/592.1 |
| 7,941,910 B2 | 5/2011 | Guercioni | |
| 8,561,447 B2 | 10/2013 | Guercioni | |
| 8,826,513 B2 * | 9/2014 | Guercioni | H02K 15/0031 29/596 |
| 2009/0302705 A1 | 12/2009 | Guercioni | |
| 2013/0118222 A1 | 5/2013 | Guercioni | |

FOREIGN PATENT DOCUMENTS

EP         1324461        7/2003

* cited by examiner

*Primary Examiner* — Minh Trinh
(74) *Attorney, Agent, or Firm* — Tarter Krinsky & Drogin LLP

(57) ABSTRACT

A twisting method is described, for twisting free end portions of bar conductors for the stator or rotor bar winding of an electrical machine. The twisting method allows achieving a non uniform twisting of the bar conductors from the welding side of the stator or rotor core by means of a twisting fixture. The twisting fixture comprises a pocket member including a main structure provided with an arc of adjacent pockets and a secondary structure, provided with at least one further pocket, which can axially translate with respect to the main structure.

10 Claims, 15 Drawing Sheets

METHOD AND FIXTURE FOR TWISTING END PORTIONS OF BAR CONDUCTORS, IN PARTICULAR FOR BAR WINDINGS OF ELECTRIC MACHINES

CROSS REFERENCE TO RELATED APPLICATIONS

This application is a Divisional application that claims the benefit of U.S. patent application Ser. No. 13/387,734, filed on Jan. 28, 2012, entitled "Method and Fixture for Twisting End Portions of Bar Conductors, in Particular for Bar Windings of Electric Machines", which is a National Stage application of PCT/IT11/00004, filed Jan. 4, 2011, entitled "Method and Fixture for Twisting End Portions of Bar Conductors, in Particular for Bar Windings of Electric Machines", which are incorporated herein by reference in their entirety.

BACKGROUND

The present invention refers to a twisting method and fixture for twisting free end portions of bar conductors, in particular for stator or rotor windings of electric machines.

It is known to provide stators or rotors of electric machines, like electrical generators or motors, for example for use in hybrid electrical vehicles (HEVs), wherein the stator or rotor winding is composed of a plurality of bar conductors, which are bent and variously interconnected to each other in order to provide so called bar windings.

In particular, the known art comprises bar windings composed of bar conductors having a rectangular cross section, where the term "rectangular" refers to a square section as well as to a "flat" section, generally indicating a rectangular section, wherein two sides of the section are smaller than the other two.

So called bar conductors are usually preformed by "U" or "P" bending, starting from linear bar conductors. U.S. Pat. No. 7,480,987 describes an exemplary method for preforming bar conductors (called "hairpin conductors" in this document). "U" or "P" preformed conductors, often also called "basic preformed conductors" in the technical field, typically have two adjacent legs, of different length, each provided with a free end portion and an opposed end portion, which is joined, by means of a joining portion, to the other leg.

For example, in order to provide a stator, it is known to carry out two different types of twisting on the "U" or "P" preformed conductors.

In a first type of twisting, also called "twisting from the insertion side", the basic preformed conductors are adequately inserted in corresponding radially aligned pockets, which are provided in a twisting device, suitable for deforming, after insertion, such conductors. The twisting device is essentially used for "driving apart" the legs of the "U" or "P" shape, in order that both legs of same conductor, after extracting the latter from the twisting device, may be successively inserted into slots of a stator core, which are radially offset to each other by a predetermined pitch.

Published patent application US 2009/0178270 describes an exemplary "insertion side" twisting method, for uniform-pitch twisting of preformed bar conductors after their insertion into pockets of a twisting device.

After having undergone the first type of twisting, the bar conductors are inserted into the slots of the stator core through a first side of same (the so called "insertion side") with respective free end portions protruding from a second side of core (the so called "welding side" or "connection side"), which is opposed to the first side.

The free end portions protruding from the welding side are then subjected to a second type of twisting, also called "welding side twisting", after being inserted into pockets provided in a suitable twisting fixture. The twisting fixture's goal is to bend ("twist") the free end portions of conductors in order to adequately shape such end portions and therefore allow the provision of adequate electrical connections between conductors in order to complete the winding.

It is to be noted that precision bending of free end portions of conductors facilitates the forming of connections among conductors. However, for various reasons, it may be difficult to correctly and precisely bend the free end portions of conductors, as required. For example, since the protrusion of the majority of these end portions on the welding side is relatively small, it may be difficult to access the end portions of conductors and carry out the operations required to ensure a correct bending both in the circumferential and in the axial direction with respect to the stator core axis. Moreover, as an example, a precise shaping of conductors is complicated by the fact that these are provided with an intrinsic elasticity, which, after bending, tries to drive them partially back to their starting configuration.

Published US patent application 2009/0302705 describes an exemplary welding side twisting method of above said type. The method described in this patent application allows at one time to achieve non uniform twisting of free end portions of bar conductors. In order to provide such twisting, the patent application describes a twisting fixture comprised of a pocket member, which is provided with a lost motion member, for defining a pocket of pocket member. In particular, the lost motion member is mounted circumferentially movable with respect to a main structure of pocket member.

It is felt the necessity to provide an alternate twisting method, with respect to the above said known art, for twisting free end portions of bar conductors for bar windings of electric machines.

The present description's general objective is to provide a twisting method, which is able to satisfy above said necessity.

This and other objectives are reached by a twisting method as defined in claim 1 in its more general form, and in its dependent claims, in some specific embodiments of the same.

A further aim of the present invention is to provide a twisting fixture as defined in claim 6 in its more general form, and in the dependent claims, in some specific embodiments of the same.

BRIEF DESCRIPTION OF THE DRAWINGS

The invention will be more clearly understood from the following detailed description of its embodiments, which are illustrative and therefore not limiting with respect to appended drawings, wherein.

DETAILED DESCRIPTION

In the appended figures, same or similar elements are indicated by the same numeral references.

In the present description, a "flat" or "square" bar conductor indicates a bar conductor having four essentially flat sides, each joined to adjacent sides, typically by a rounded edge.

Therefore, the words "flat" or "square" or equivalent terms used to describe the cross section of a bar conductor, are used in a general sense, and should not be interpreted as excluding the fact that such bar conductors have significantly rounded edges joining the substantially flat sides. The term "flat conductor" is to be regarded as meaning that the conductor has two opposed sided, whose mutual distance is greater than the distance between the remaining opposed sides. In the present description, the term "rectangular conductor" is to be regarded as a generalization of a flat and square conductor, since the square conductor is a special case of a rectangular conductor, wherein the four sides have the same size.

In the present description, a pocket may be defined as a recess or depression in a member, which is completely surrounded by this member, as well as by a cavity in a member, wherein an open side of cavity is such as to be effectively closed by a surface or wall of an adjacent member.

For the purposes of the present description, the term "twisting" used with reference to end portions of bar conductors, is to be regarded in a general sense as a bending or shaping of such portions, in order to provide adequate electrical connections among conductors.

For the purposes of the present description, the terms "radial" or "circumferential" or other similar expressions defined with respect to a direction or axis, have to be referred to a circumference, which lies on a plane perpendicular to such direction or axis and is centered on such direction or axis. Moreover, for the purposes of the present description, the term "angularly spaced" (or other similar expressions), defined with respect to a direction or axis, refers to the angle between two radii of a circumference, which lies in a plane which is perpendicular to said direction or axis, and whose center lies in said direction or axis.

Figures 7A, 7B, 7C:
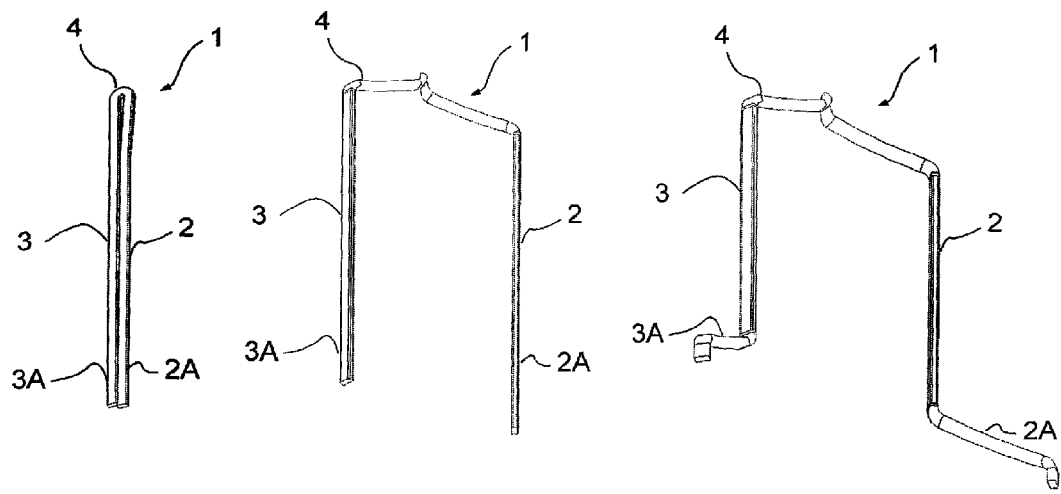
FIGS. 7A-7C show three perspective views of a bar conductor, in three different configurations, respectively.
Figures 8A, 8B, 8C:
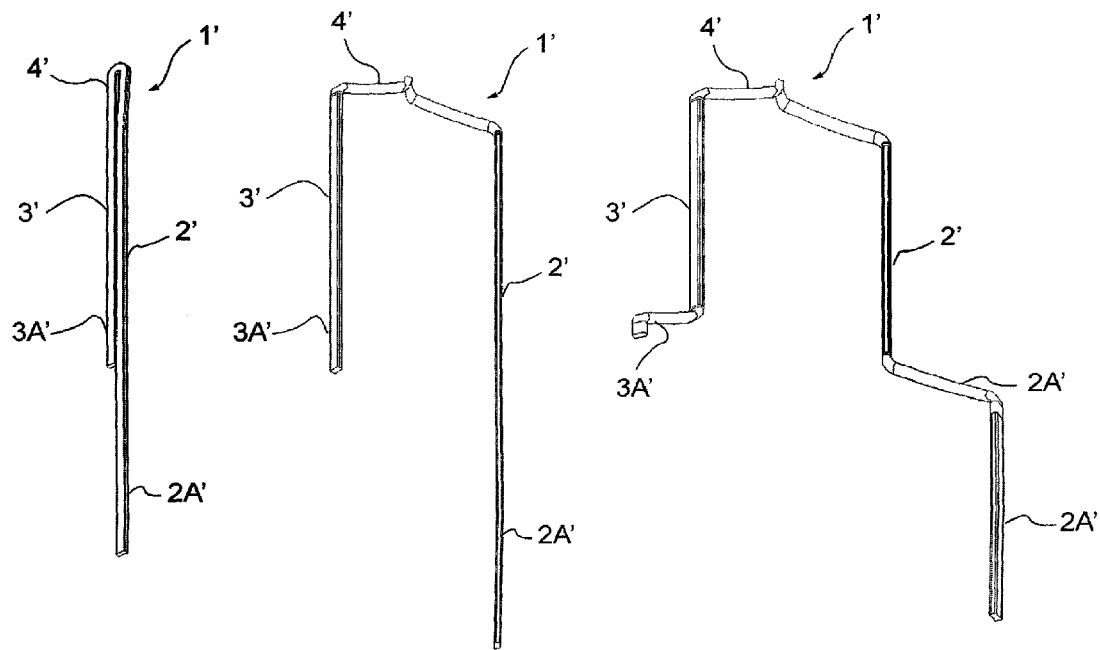
FIGS. 8A-8C show three perspective views of a further bar conductor, suitable for being used as phase terminal, which is shown in three different configurations, respectively.

Initially referring to FIGS. 7A and 8A, two embodiments of bar conductors 1, 1' for a stator or rotor winding of an electrical machine are respectively shown. In this example, conductors 1, 1' are flat rectangular copper conductors, since they have a pair of opposed faces, whose mutual distance is greater than the distance between the other two opposing faces.

As is shown in FIG. 7A, the conductor 1 is a first pre-formed "P" shaped conductor, having two legs 2, 3 which are connected by a connection portion 4, and each having a respective free end portion 2A, 3A. The connection portion 4 is also frequently called "head portion" in the relevant art sector. As may be noted in FIG. 7A, leg 2A is slightly longer than leg 3A.

The conductor 1' shown in FIG. 8A is a second bar conductor, in particular a conductor suitable for being used as a phase terminal, having a shape which is essentially identical to that of conductor 1, except for the fact of having an leg which is significantly longer than the other. In particular, conductor 1' comprises two legs 2', 3', which are connected by a connection portion 4' and each having a respective free end portion 2A', 3A'.

Figure 1:
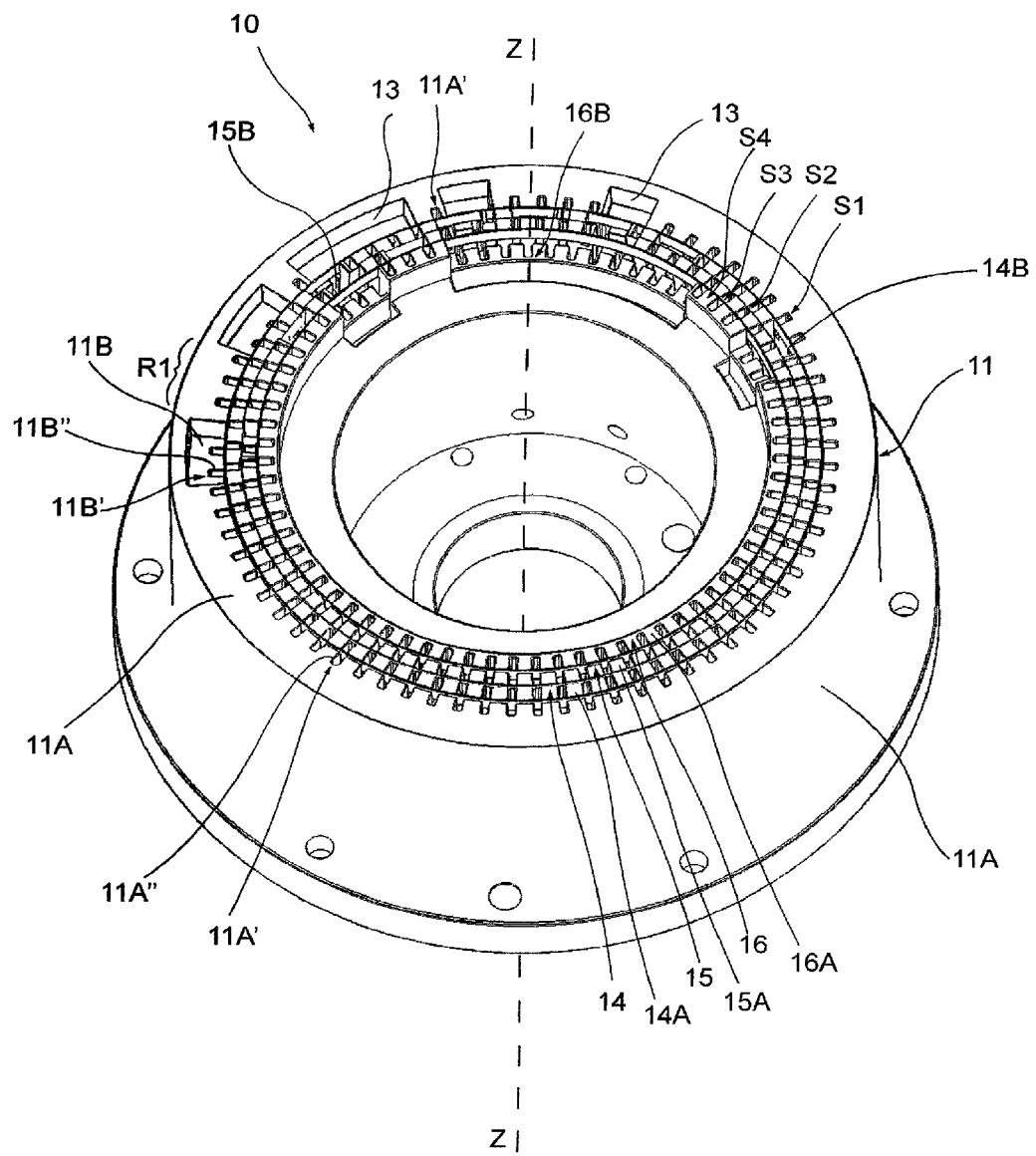
FIG. 1 shows a perspective view of a currently preferred embodiment of a twisting fixture for twisting free end portions of bar conductors, in particular for windings of electric machines, wherein the twisting fixture is shown in a first operating configuration.

Referring now to FIG. 1, 10 generally indicates a currently preferred embodiment of a twisting fixture for twisting free end portions of bar conductors for bar windings of electric machines. For example, fixture 10 is suitable for twisting free end portions 2A, 3A and/or free ends 2A', 3A' of a plurality of bar conductors 1, 1'.

The twisting fixture 10 comprises at least one pocket member 11, extending about a twisting axis Z-Z. The preferably ring shaped pocket member 11 comprises a main structure 11A and at least one secondary structure 11B, which is movably supported with respect to main structure 11A.

Figure 5:
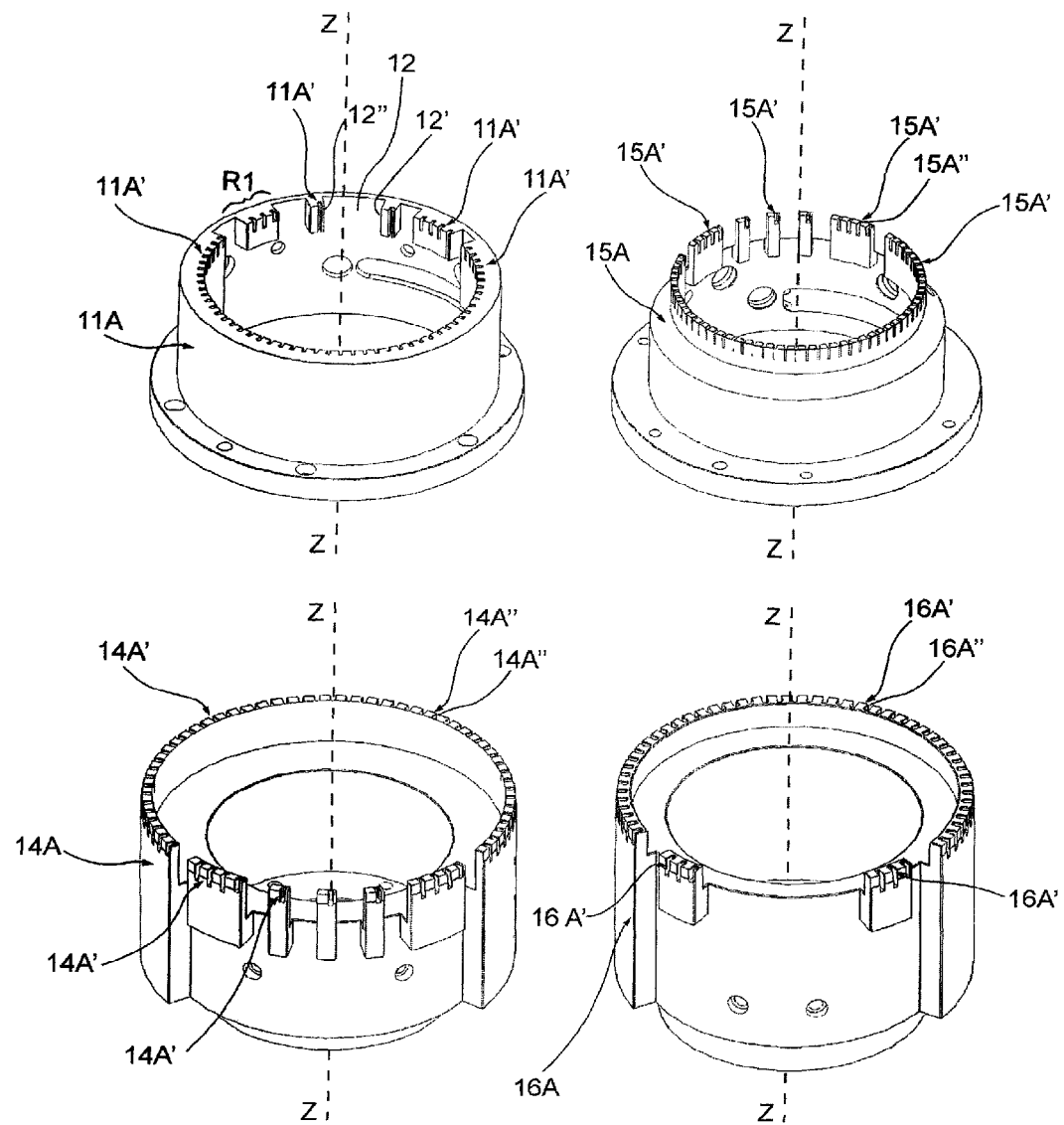
FIG. 5 shows four perspective views of four components of fixture of FIG. 1.

According to a currently preferred embodiment shown in FIG. 5, the main structure 11A has an annular shape, which in this example is essentially cylindrical.

Figure 6:
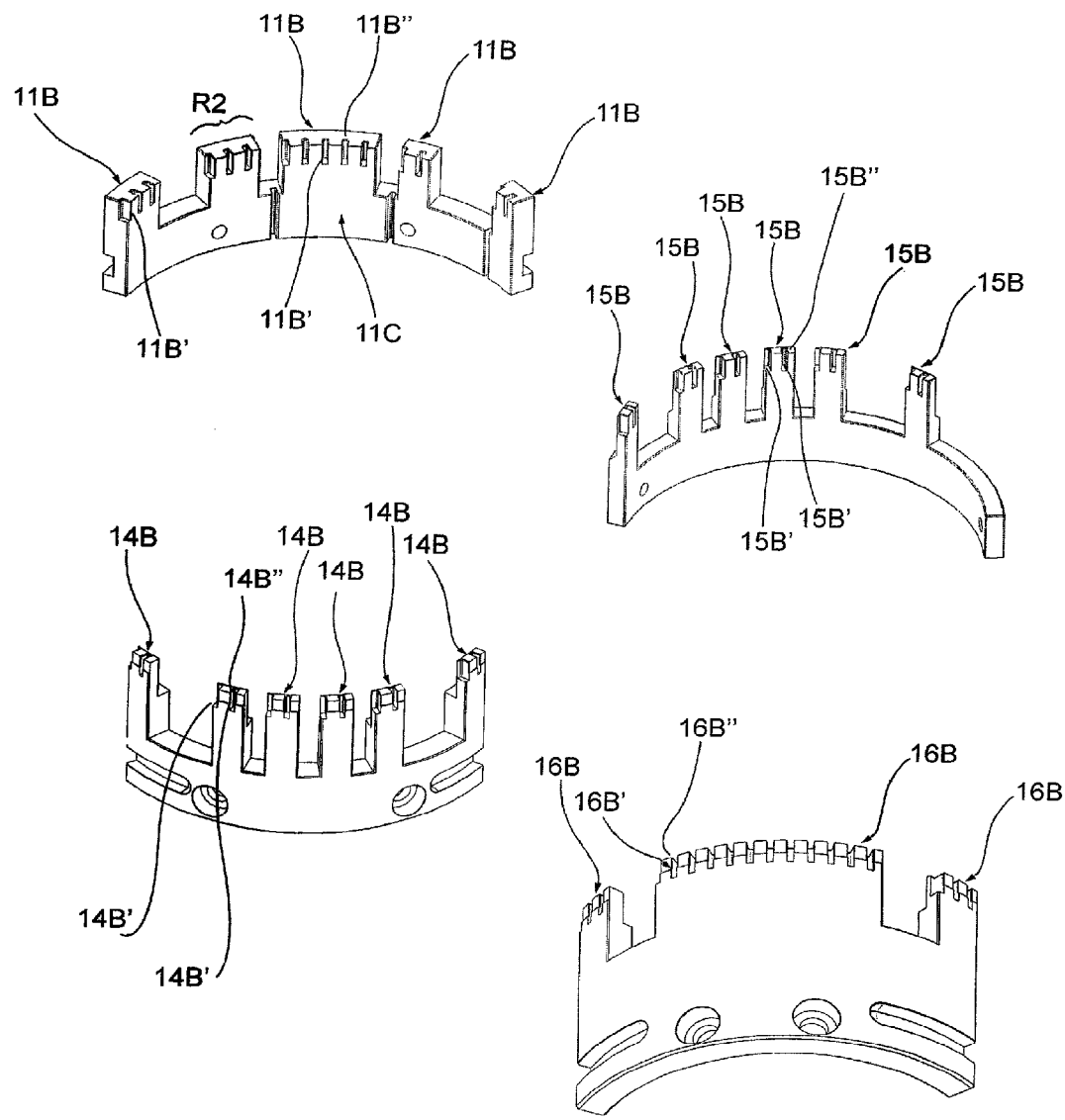
FIG. 6 shows four perspective views of four other components of fixture of FIG. 1.

In FIG. 6, a plurality of secondary structures 11B is shown, in particular five secondary structures 11B, according to a currently preferred embodiment. In particular, the secondary structures 11B in FIG. 6 may be coupled to the main structure 11A of FIG. 5, in order to provide the pocket member 11. In the embodiment of FIG. 6, the secondary structures 11B are fixed to each other by means of a curved support base 11C, for rigidly connecting to each other the end portions of structures 11B. According to further embodiments, however, the secondary structures 11B may be separated from each other. In other words, the structures 11B may also be completely distinct structures, which may be independently actuated.

Figure 3:
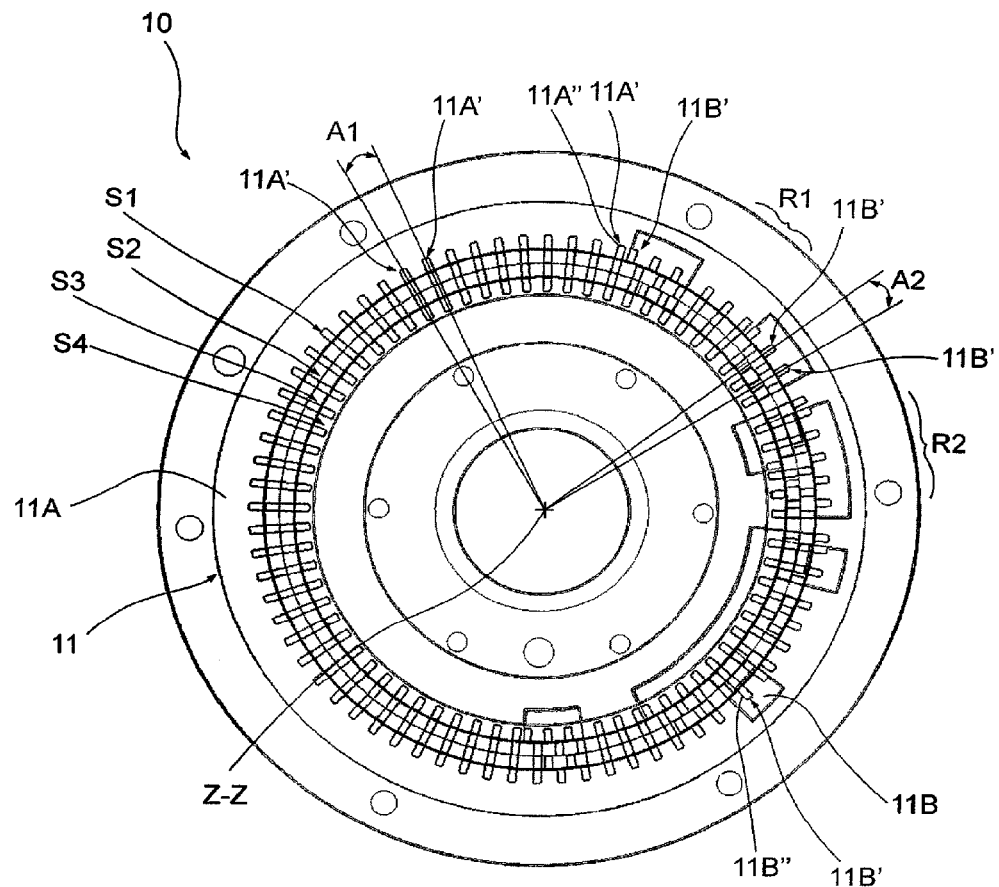
FIG. 3 shows a plan view from above of fixture of FIG. 1 in the first operating configuration.
Figure 4:
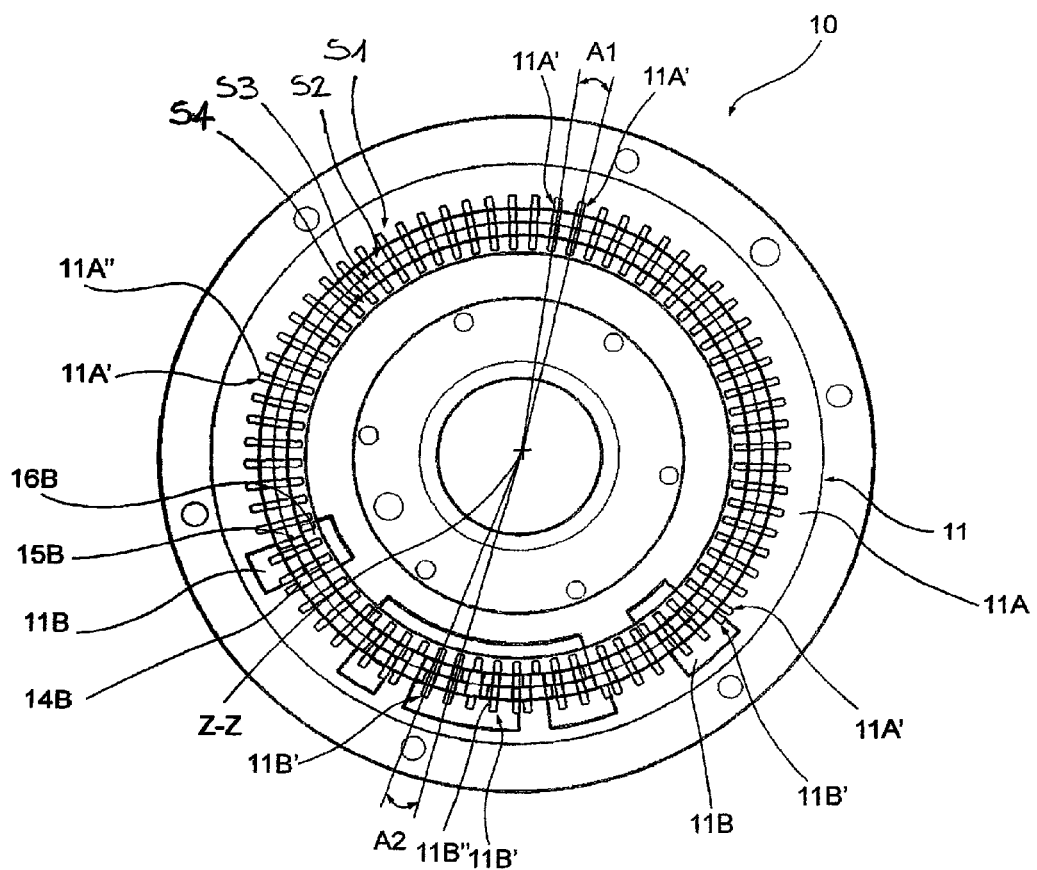
FIG. 4 shows a view from above of fixture of FIG. 1, in the second operating configuration.

With reference to FIG. 3 or 4, it may be noted that the pocket member 11 is provided with a circular array of pockets S1, whose center lies on the twisting axis Z-Z. The array S1 comprises a plurality of pockets 11A', 11B', which are respectively defined by the main structure 11A and secondary structures 11B and are such as to globally form the array S1. The array S1 in the example comprises 72 pockets. It is to be noted that in FIGS. 3 and 4, the twisting axis Z-Z is perpendicular to the drawing plane and is schematically represented by a cross.

Pockets 11A', 11B' are each provided with an insertion opening 11A", 11B", or inlet opening 11A", 11B", through which a respective free end portion of bar conductor may pass, for example one of end portions 2A, 3A, 2A', 3A' of conductors 1, 1', in order to allow such portion to be inserted in the respective pocket. As may be noted, openings 11A", 11B" in this example have a substantially rectangular shape and are positioned on preferably planar end faces of the main structure 11A and secondary structures 11B, respectively. Such end faces are in particular transversal or essentially perpendicular to the twisting axis.

The main structure 11A is such as to define at least a pocket arc R1 comprised of a plurality of adjacent pockets 11A' of array S1. As is shown in FIG. 5, in this example, the main structure 11A is provided with a plurality of pocket arcs R1. More in particular, the structure 11A is comprised of three pocket arcs R1, which are angularly spaced with respect to twisting arc Z-Z, each comprising a different number of pockets 11A'. As is shown in FIG. 5, beside the three arcs R1, in this example, structure 11A is such as to define two further pockets 11A', which are angularly spaced to each other and which in particular have an axial extension (Z-Z axis) which is greater than that of the other pockets 11A'.

Turning back to FIG. 3 or 4, it is to be noted that pockets 11A' of each arc R1 are angularly and uniformly distributed. In other words, as is shown in FIG. 3 or 4, centers of two adjacent pockets 11A' are angularly spaced from each other by a same predetermined angle A1 with respect to twisting axis Z-Z. In this example, angle A1 is in particular equal to 5°.

Still referring to FIG. 3 or 4, it is to be noted that each secondary structure 11B is such as to define at least one pocket 11B' of array S1. In other words, each secondary structure 11B defines at least a further pocket 11B' of array S1, in addition to pockets 11A' defined by main structure 11A.

In the exemplary embodiment, the secondary structures 11B are such as to define each a pocket arc R2 including a plurality of adjacent pockets 11B'. In particular, also pockets of arcs R2 are angularly and uniformly distributed, so that centers of two adjacent pockets 11B' are angularly spaced from each other by a same predetermined angle A2, with respect to twisting axis Z-Z. In this example, angle A2 is equal to angle A1, i.e. 5°.

However, it is to be noted that pockets 11B' of each secondary structure 11B are all circumferentially offset in a direction by a predetermined quantity with respect to pockets 11A'. In other words, as is for example shown in FIG. 3, centers of adjacent pocket 11A' and pocket 11B' are angularly spaced with respect to twisting axis by an angle which is not equal to said angles A1, A2.

The secondary structures 11B are axially slidably mounted, i.e. they may slide in the direction of the twisting axis Z-Z, with respect to main structure 11A. More in particular, secondary structures 11B are adapted to translate in the direction of the twisting axis Z-Z only, with respect to main structure 11A. In other words, structures 11B are rotationally integral with main structure 11A about twisting axis Z-Z. Again in other words, each structure 11B is essentially provided only with one degree of freedom with respect to main structure 11A. In this example, in order to allow said axial sliding, secondary structures 11B are coupled to main structure 11A by means of precision couplings. With reference to FIG. 5, in order to provide such precision couplings, the pocket member 11 preferably includes a plurality of slide seats 12, in this example five slide seats 12, each defined by a pair of circumferentially opposed pair of guiding walls 12', 12". Particularly, a respective secondary structure 11B is slidable in each seat 12.

Figure 2:
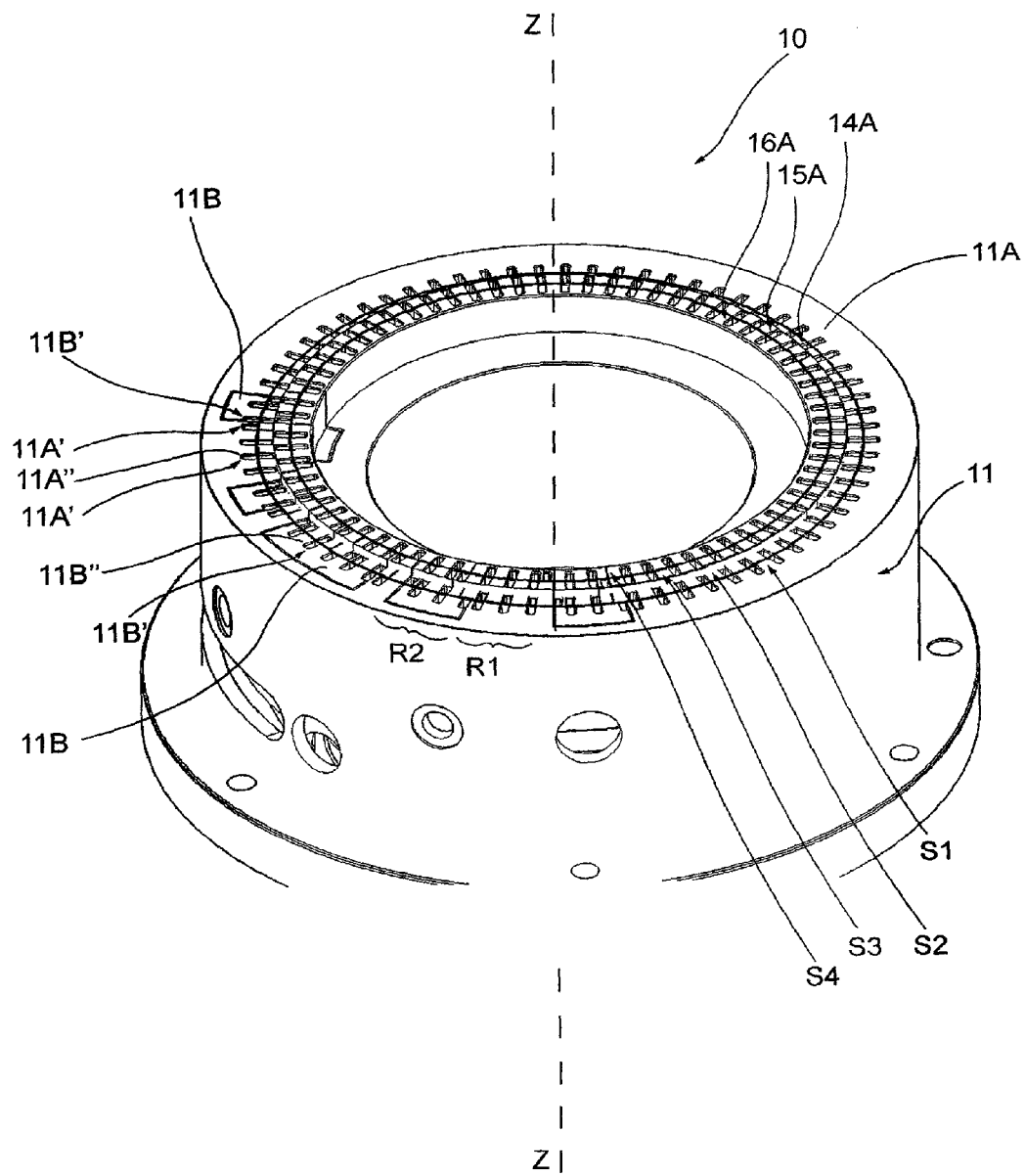
FIG. 2 shows a perspective view of fixture of FIG. 1, wherein the fixture is shown in a second operating configuration.

With reference to FIGS. 1 and 2, it is to be noted that each secondary structure 11B is such as to take up an axially backward operating position (FIG. 1) and an axially forward operating position (FIG. 2) with respect to the axially backward position.

As may be noticed in FIG. 1, in the axially backward position (Z-Z axis), each secondary structure 11B is such as to define a recess 13 or cavity 13 of the pocket member 11. In particular, in such position, insertion openings 11B" of structures 11B are positioned at a first axial distance (Z-Z axis) of insertion openings 11A" of pocket arcs R1 of main structure.

With reference to FIG. 2, in the axially forward position (Z-Z axis), the insertion openings 11B" of pockets 11B are positioned at a second axial distance from inlet openings 11A" of arcs R1 of main structure 11A. Such second axial distance is preferably less than the first axial distance. In the currently preferred exemplary embodiment, when the secondary structures 11B take up the axially forward position, the insertion openings 11B" are, in particular, flush (FIG. 2) with insertion openings 11A". According to a further embodiment, in the axially forward position of structures 11B, openings 11B" may be substantially flush with insertion openings 11A", instead of being perfectly flush with said openings. In this case, openings 11B" are preferably positioned in an axially backward position with respect to insertion openings 11A", wherein their distance from latter openings is preferably equal to some millimeters, for example 1 mm-3 mm.

Referring now to FIGS. 1, 5 and 6, it is to be noted that, according to a currently preferred embodiment, the twisting fixture 10 comprises at least a pair of pocket members. In particular, in this example, the fixture 10 comprises two pairs of pocket members 11, 14 and 15, 16, which are mutually coaxial. In this example, as may be noted from FIGS. 5 and 6, members 14, 15 and 16 display some structural differences with respect to member 11. However, such members have characteristics corresponding to and a function essentially analogous to those of member 11. In other words, members 14, 15, 16 respectively comprise, as an example (FIGS. 1, 6 and 6):

- a circular array of pockets S2, S3, S4;
- a main structure 14A; 15A, 16A, provided with at least one pocket arc, including a plurality of pockets 14A', 15A', 16A' provided with insertion openings 14A", 15A", 16A"; and
- at least one secondary structure 14B, 15B, 16B, which is axially slidably mounted (Z-Z axis) with respect to main structure 14A, 15A, 16A, the secondary structure 14B, 15B, 16B being provided with at least one pocket 14B', 15B', 16B' with an insertion opening 14B", 15B", 16B".

Figure 11:
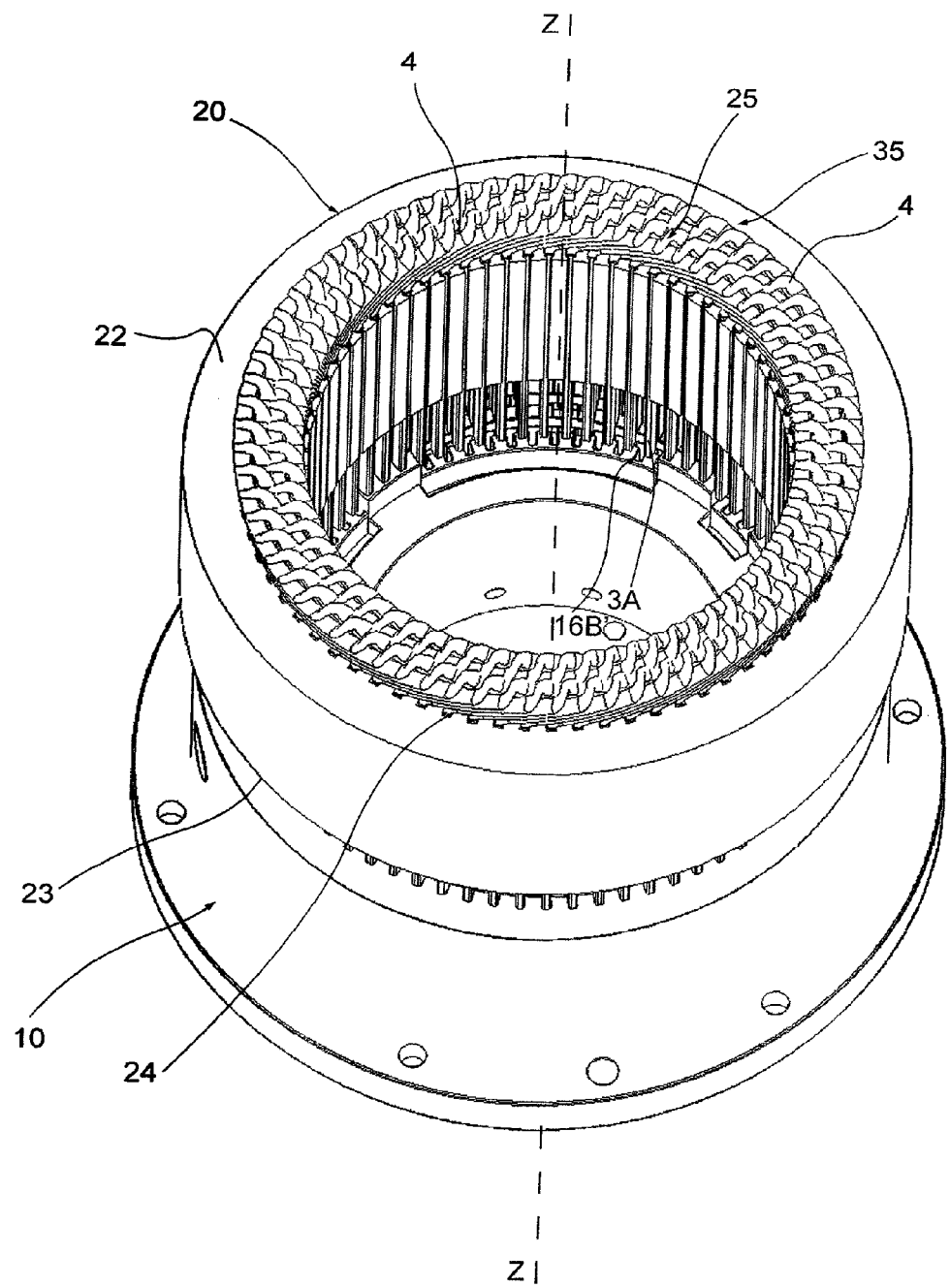
FIG. 11 shows a perspective view of core and fixture of FIG. 9, generally shown in a fourth operating configuration.

Referring now to FIG. 11, there is shown fixture 10 and stator or rotor core 20. For example, core 20 is the core of a stator or rotor of an electric machine, such as for example an electric motor, for example for an electric or hybrid vehicle.

As known per se, the core 20 comprises a lamellar tubular main body, axially extending along a stator axis (which corresponds, in FIGS. 9-12, to twisting axis Z-Z) between two opposing faces 22, 23, which are called insertion face 22 and welding face 23, respectively. Main body of core 22 comprises a plurality of slots 24, which axially extend (i.e. in the direction of stator axis) inside the thickness of main body and which may be passed through by a plurality of bar conductors. In this example, in particular, core 20 comprises seventy two slots 24. More in particular, slots 24 are angularly and uniformly distributed so that centers of two adjacent slots 24 are angularly spaced with respect to twisting axis, by an angle equal to above said angle A1, i.e. 5°.

According to an embodiment, slots 24 of core 20 are populated by two crowns 25, of bar conductors, in particular, a radially internal crown 25 and a radially external crown 35. In this example, the crown 25 exclusively comprises a plurality of conductors 1 (FIGS. 7A-7C) whereas crown 35 comprises of both a plurality of conductors 1 and a plurality of phase terminals 1' (FIGS. 8A-8C).

Figure 9:
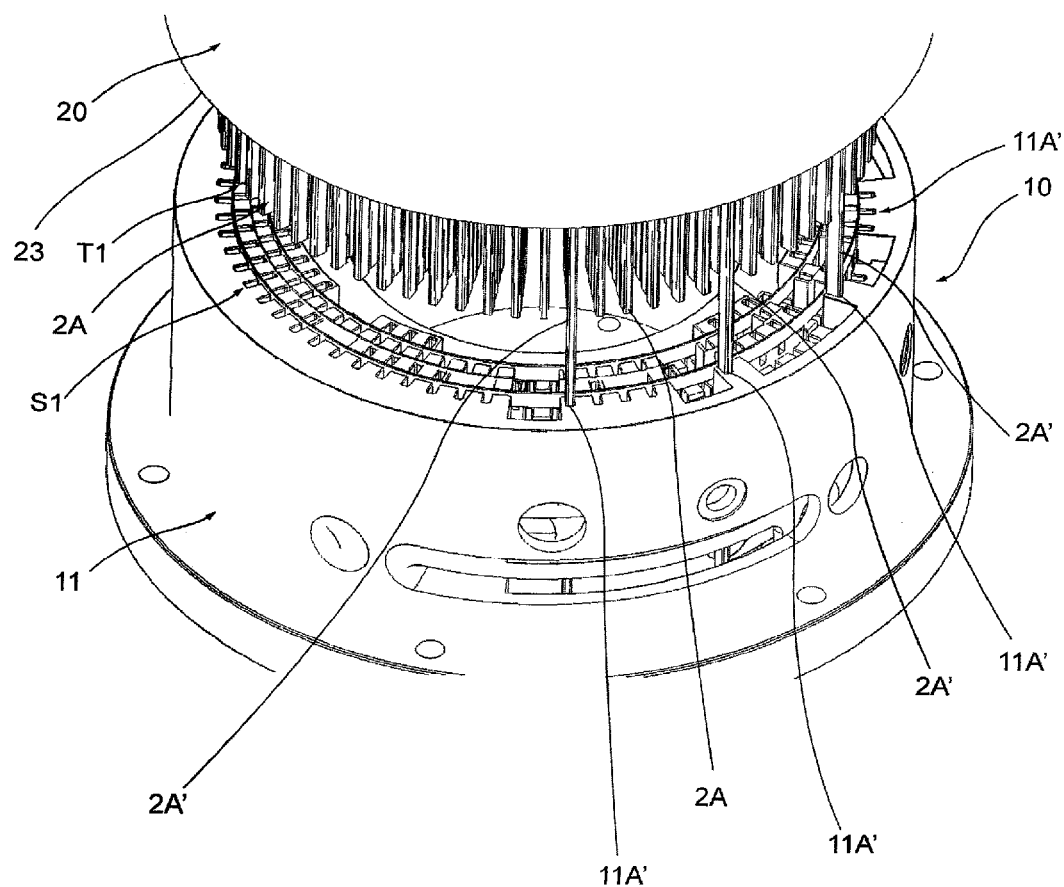
FIG. 9 shows a perspective view, wherein the fixture of FIG. 1 in the first operating configuration and a stator or rotor core for an electrical machine having a plurality of bar conductors inserted in respective slots are shown, wherein the core and the fixture are shown in their entirety in a third operating configuration.
Figure 10:
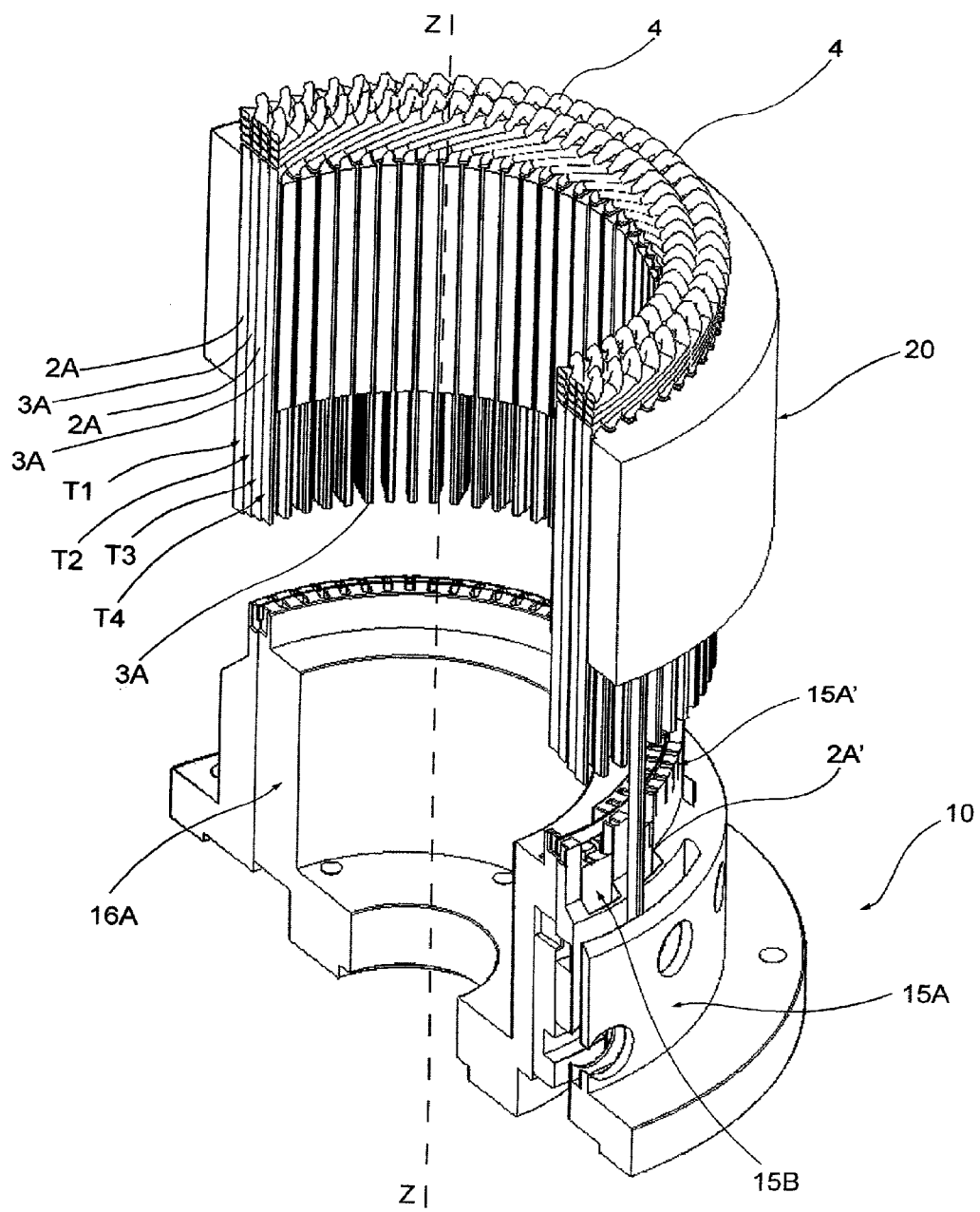
FIG. 10 shows a further view of core and fixture of FIG. 9, shown in a perspective section in third operating configuration, wherein some components of twisting fixture have been removed.

With reference to FIGS. 9 and 10, wherein core 20 is partially shown, it may be noted that conductors 1 and 1' are inserted into slots 24 with respective free end portions 2A, 3A and 2A', 3A', protruding from welding face 23. It is also to be noted that, in FIGS. 9-13, conductors 1 and 1' inserted into core 20 have respective shape of FIGS. 7B and 8B. In other words, such conductors have respective legs 2, 3 and 2', 3' separated by a predetermined quantity, for example following a twisting operation of "head portions" 4, 4' (such twisting is known to the skilled in the field and is therefore not further described). It is also to be noted that free end portions 2A, 3A, 2A', 3A' of FIGS. 9-13 are straight end portions, i.e. without any bending.

Figure 12:
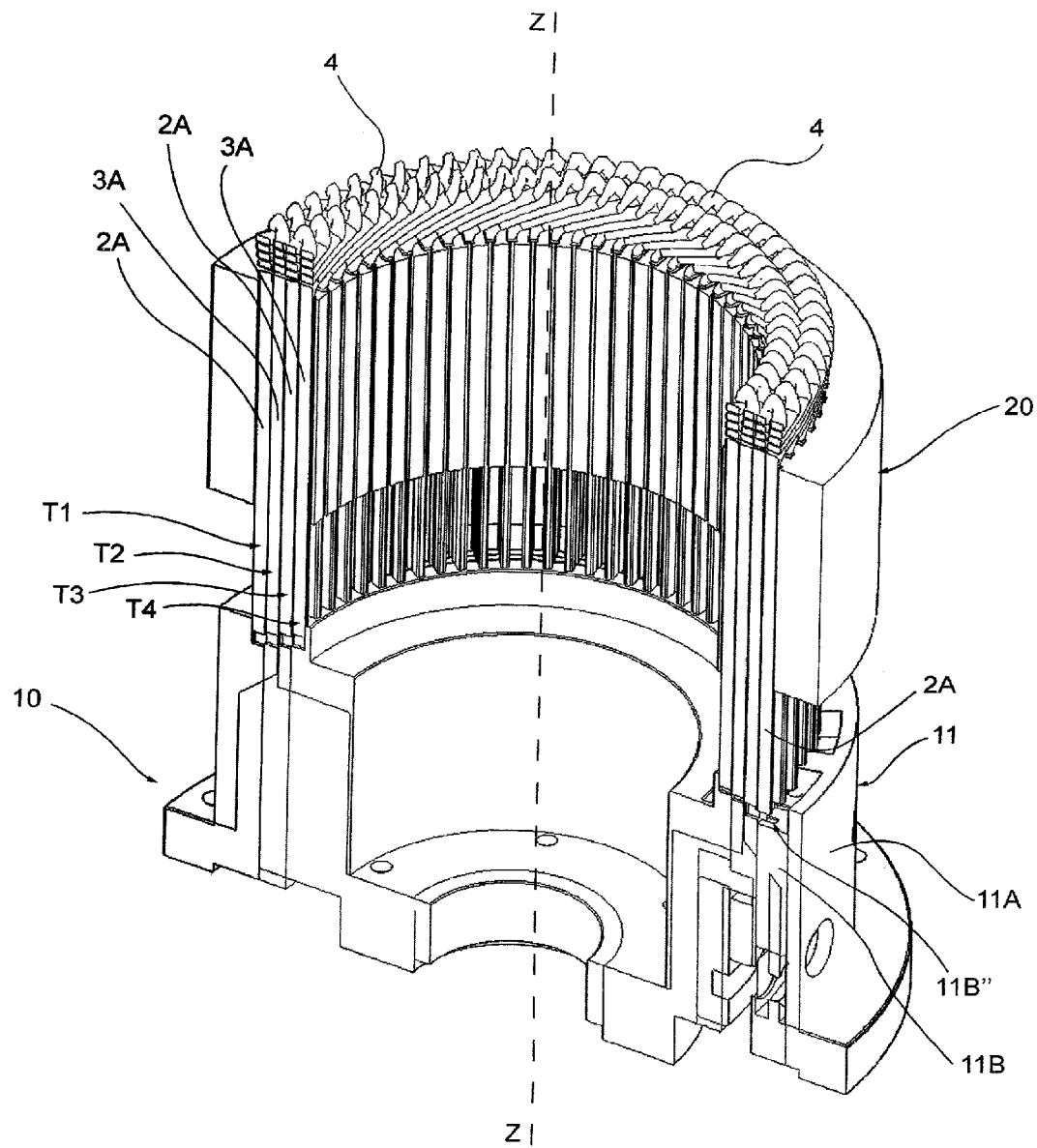
FIG. 12 shows a further sectional and perspective view of core and fixture of FIG. 9 in a fourth operating configuration.
Figure 13:
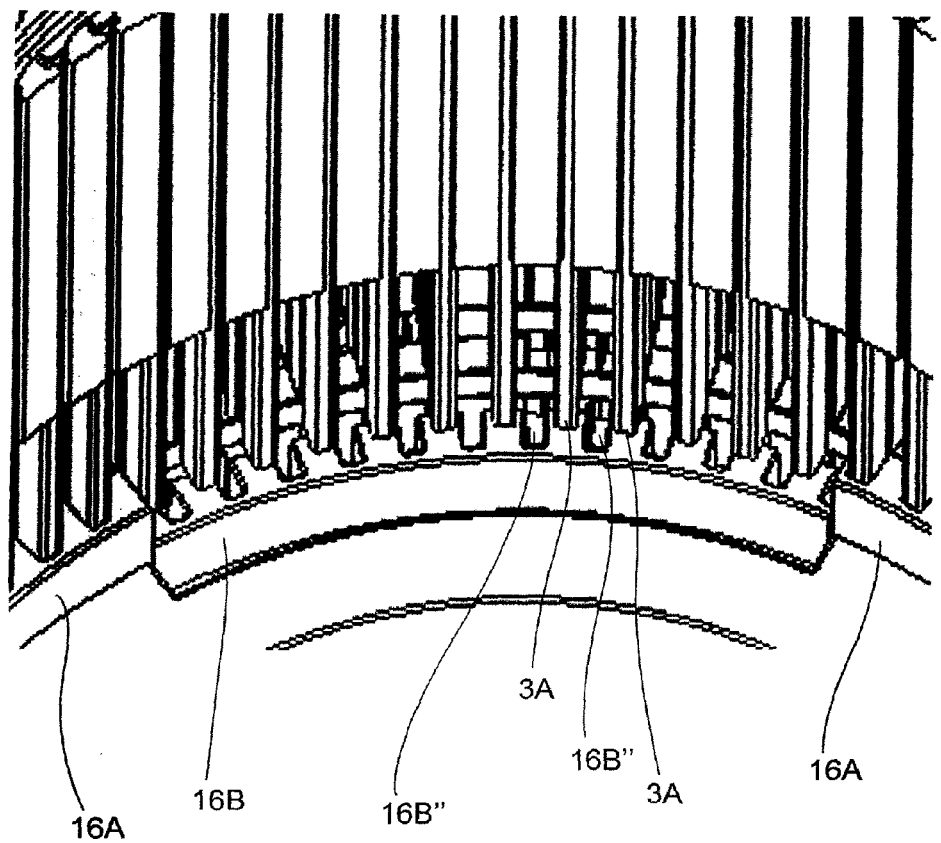
FIG. 13 shows an enlarged detail of FIG. 12.

With reference to FIG. 12, wherein core 20 and fixture 10 are represented in a perspective section, it may be noted that legs of bar conductors are positioned inside the core 20 so that they form four circular concentric arrays of legs, and therefore, four circular concentric arrays of free end portions T1, T2, T3, T4, protruding from welding face 23. In particular, free end portions of each array T1-T4 are preferably flush or essentially flush to each other, except for free end portions 2A' of phase terminals 1' of array T1, which form a significant protrusion with respect to other end portions 2A of array T1.

Moreover, as is shown in FIG. 12, the end portions of arrays T1-T4 are radially aligned to each other with respect to twisting axis Z-Z.

An exemplary operation of a twisting fixture, as previously described, is described in the following.

In FIG. 9, fixture 10 and core 20 are represented in an insertion configuration of bar conductors 1, 1' in pocket members 11, 14, 15, 16. In FIG. 9, fixture 10 in particular take ups an initial configuration corresponding to configuration of FIG. 1. In other words, all the secondary structures 11B, 14B, 15B and 16B of pocket members 11, 14, 15, 16 take up above said axially backward operating position (downward backward position in the figures).

Core 20 is initially supported at an axial distance (Z-Z axis) from fixture 10, the end portions of arrays T1-T4 being directed towards pocket arrays S1-S4. It is to be noted that arrays T1-T4 are associated to respective arrays S1-S4.

Core 20 and fixture 10 are then axially brought together (Z-Z axis) in order to insert one part of end portions 2A, 3A, 2A', 3A' of arrays T1-T4 into pockets of main structures 11B, 14B, 15B and 16B of pocket members. In this way, the arrangement of FIGS. 11 and 12 is obtained.

It is to be noted that, in such an arrangement, all pockets 11A', 14A', 15A', 16A' of main structures 11A, 14A, 15A, 16A internally receive a respective free end portion of arrays T1-T4. It is also to be noted that, with this arrangement, since the secondary structures 11B, 14B, 15B, 16B are in said backward position, the end portions of arrays T1-T4 which are not inserted into pockets of main structures 11A, 14A, 15A, 16A, are positioned outside of pockets 11B', 14B', 15B', 16B' at an axial distance (Z-Z axis) from insertion openings 11B", 14B", 15B", 16B" of secondary structures 11B, 14B, 15B, 16B.

It is also to be noted that in the arrangement of FIG. 11 or 12, the free end portions of arrays T1-T4 which are not inserted into pockets of main structures 11A, 14A, 15A, 16A, are axially offset to each other (Z-Z axis) with respect to corresponding pockets of secondary structures 11B, 14B, 15B, 16B, by a predetermined angle with respect to twisting axis. This offset between the end portions of arrays T1-T4 and pockets of secondary structures 11B, 14B, 15B, 16B is shown, as an example, in FIG. 13, where some end portions of array T4 are shown, which are axially offset with respect to corresponding pockets 16B' of one 16B of secondary structures.

In this example, each of end portions of arrays T1-T4 which are not inserted into pockets of main structures 11A, 14A, 15A, 16A, is axially offset with respect to corresponding pocket (i.e. with respect to pocket of secondary structure 11B, 14B, 15B, 16B, in which said end portion is to be inserted), by an angle equal to half the angle A1 or A2 (which is also equal to the angle between two adjacent slots 24), i.e., in this example, by an angle of 2.5°. In any case, it is appropriate to point out that, in general terms, in order to avoid interferences among the free end portions of conductors during twisting, it is important that above said offset corresponds to an angle less than angle A2 between two adjacent pockets 11B'.

Starting with arrangement of FIG. 11, the pocket members 11, 14, 15 and 16 are rotationally actuated about twisting axis Z-Z and are simultaneously translated in the axial direction, in particular by bringing the fixture 10 closer to the core 20, in order to carry out a first twisting only of end portions of arrays T1-T4 which have been inserted into pockets of main structures 11A, 14A, 15A, 16A. In particular, pocket members are each rotated in an opposite direction with respect to adjacent pocket member, in order to twist the end portions of arrays T1-T4 in opposite directions.

In other words, in order to carry out the first twisting, fixture 10 and core 20 are subject to a relative rotational-translational motion, preferably in a continuous way, with respect to twisting axis Z-Z. In this regard, it is to be noted that, in principle, the rotational-translational relative motion may be attained by different ways. For example, assuming the twisting of only one of arrays T1-T4, by means of a twisting fixture including only one pocket member, for example, member 11, the arrangement may be such that the pocket member is held still and the core 20 is rotated and translated. On the other hand, one may rotate the pocket member, wherein the core 20 is simultaneously translated towards such member. However, alternate methods, with respect to the one described for achieving said relative rotational-translational motion, are generally less advantageous.

In this example, at the end of first twisting, pocket members 11, 14, 15 and 16 have each progressed through a rotation with respect to twisting axis which is equal to 2.5°. Therefore, the free end portions of arrays T1-T4, which were initially axially offset with respect to corresponding pockets, at the end of first twisting, are axially aligned with corresponding pockets of secondary structures 11B, 14B, 15B and 16B.

It is also to be noted that such end portions remain outside of pockets of secondary structures 11B, 14B, 15B and 16B, during the whole first twisting.

Moreover, at the end of first twisting, such end portions are still straight end portions, whereas the end portions which are inserted into the pockets of main structures 11A, 14A, 15A and 16A are bent end portions.

At the end of first twisting step, starting from the axially backward position, secondary structures 11B, 14B, 15B and 16B are axially translated with respect to main structures 11A, 14A, 15A and 16A, simultaneously in this example, in order to insert the remaining end portions of arrays T1-T4 into pockets of secondary structures 11B, 14B, 15B and 16B. In other words, secondary structures are actuated in order to axially translate until they take up the above said axially forward position (FIG. 2), at which the remaining free end portions of arrays T1-T4 are received within pockets of secondary structures. In particular, in such an arrangement, the insertion openings 11B", 14B", 15B" and 16B" of secondary structures are flush or substantially flush with insertion openings 11A", 14A", 15A" and 16A" of pockets of main structures. Moreover, in such a configuration, free end portions which are inserted in pockets of secondary structures 11B, 14B, 15B and 16B are still straight, i.e. free of bends.

Once the protruding end portions of all arrays T1-T4 are inserted into pockets of fixture 10, a second twisting is carried out, wherein all end portions of arrays T1-T4 are simultaneously bent by further relative rotational-translational motion between core 20 and pocket members of fixture 10. The second twisting is carried out in substantially analogous way to first twisting. However, in the second twisting, the pocket members of this example carry out a greater rotation with respect to twisting axis Z-Z. In particular, in this example, at the end of second twisting, each pocket member has carried out an additional rotation by 20° with respect to that of first twisting. Therefore, in this example, the end portions which had been subject to first twisting are subject, in total, to a twisting by 22.5° at the end of second twisting, whereas end portions which have only been subject to second twisting are subject to a total twisting by 20°. By means of fixture 10 it is therefore possible to carry out a non uniform twisting of free end portions of arrays T1-T4.

Figure 14:
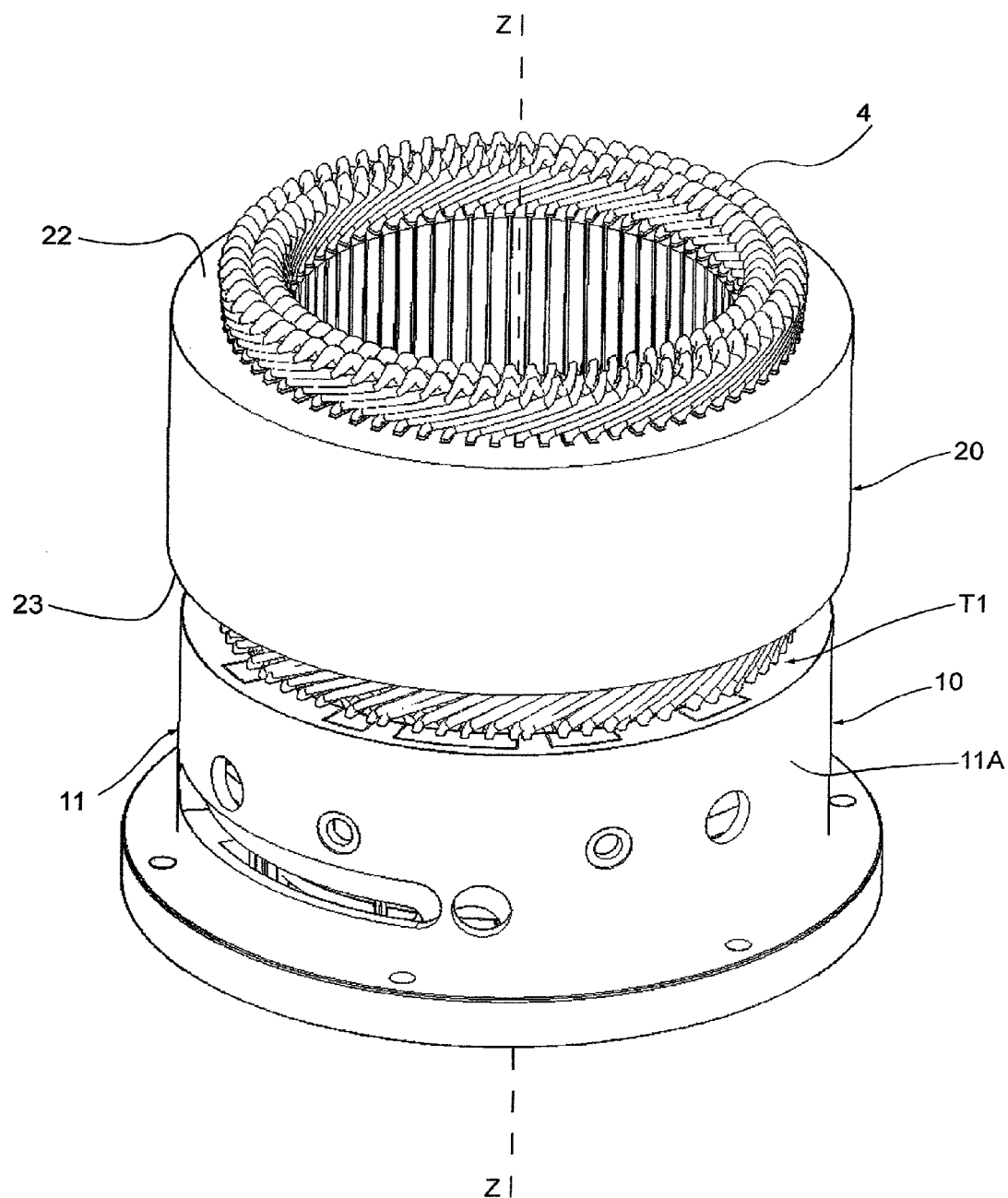
FIG. 14 shows a further perspective view of core and fixture of FIG. 9, wherein the core and fixture shown are in the fourth operating configuration.

FIG. 14 shows the core 20 and fixture 10 at the end of second twisting step. It is to be noted that in this configuration, conductors 1, 1' of this example are respectively arranged as shown in FIGS. 7C and 8C.

Figure 16:
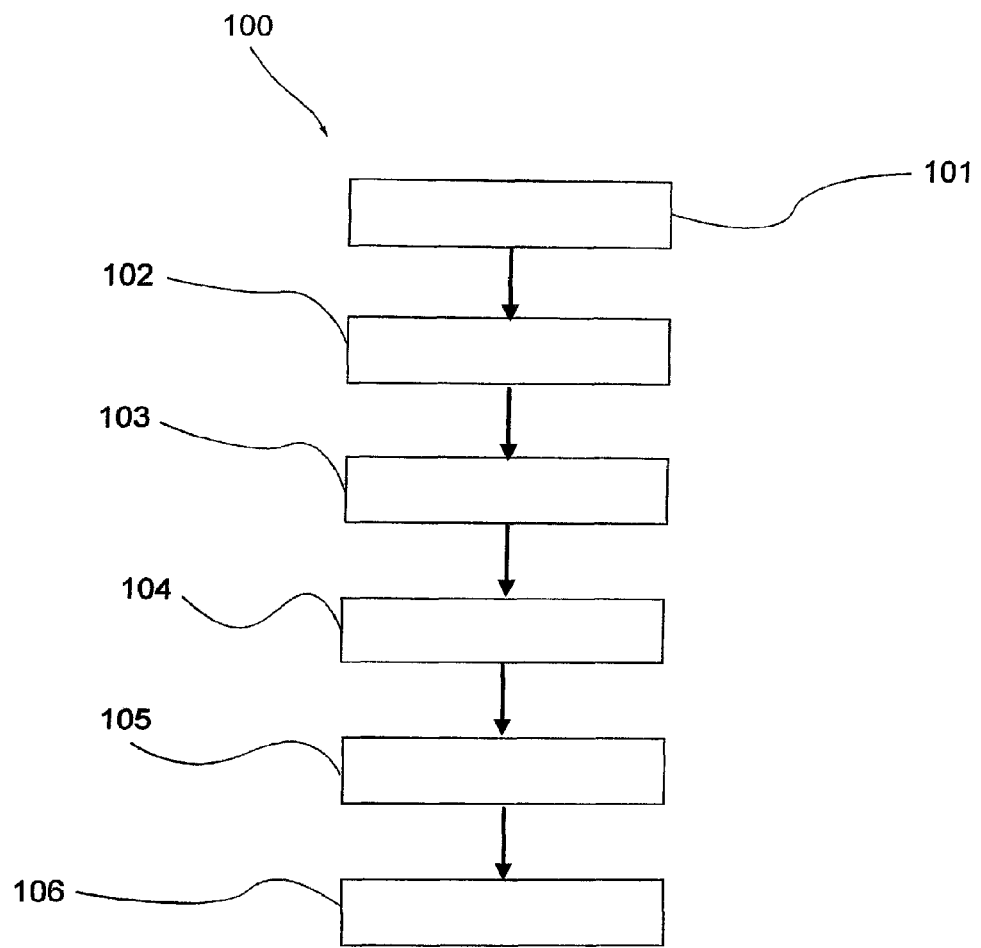
FIG. 16 shows a flow chart of a twisting method.

With reference to FIG. 16, based on above said operation of fixture 10, it is to be noted that, generalizing such operation has been described a twisting method 100 for twisting free end portions of bar conductors for bar windings of electric machines, comprising:

a) a step of providing 101 a twisting fixture 10 comprising at least a pocket member 11 extending about a twisting axis Z-Z and provided with a circular array S1 of pockets having its center on the twisting axis Z-Z, the pocket member 11 including a main structure 11A provided with an arc R1 of adjacent pockets of said array S1 and a secondary structure 11B which is movably mounted with respect to main structure 11A and which is provided with a further pocket 11B' of said array S1, each of the pockets of said array S1 comprising a respective insertion opening 11A", 11B", which is to be passed through by one of said free end portions 2A or 2A' for inserting said free end portion into said pocket;

b) a step of providing 102 a stator core 20 or rotor core 20 provided with a plurality of slots 24 which are populated by a respective plurality of said bar conductors 1, 1' positioned with said free end portions 2A, 2A' protruding from a side of stator or rotor core 20, said protruding end portions forming a circular array T1 of end portions 2A, 2A;

c) a step of inserting 103 into arc R1 of pockets of main structure 11A an arc of adjacent end portions 2A, 2A' of said array of end portions T1;

d) a first step of twisting 104 the arc of end portions, which is inserted into said arc R1 of pockets, by relative rotational-translational motion between said core 20 and said pocket member 11;

e) the step of axially translating (Z-Z axis) 105 the secondary structure 11B with respect to main structure 11A, for inserting, into said further pocket 11B' of secondary structure 11B, a further end portion 2A or 2A' of said array T1, in addition to the arc of end portions which are inserted into said arc R1; and f) a second step of simultaneous twisting 106, by means of a further relative rotational-translational motion between said core 20 and said pocket member 11, the arc of end portions, which is inserted into the arc of pockets R1 of main structure 11A, and further end portion 2A, 2A', which is inserted into further pocket 11B' of secondary structure 11B.

According to an embodiment, the twisting method 100 comprises a step, before the first twisting step 104, of making the secondary structure 11B to take up an axially backward operating position with respect to main structure 11A, such as, while said arc of end portions is inserted in the arc R1 of pockets, the further end portion 2A or 2A' may be positioned outside the further pocket 11B' at a certain axial distance from insertion opening 11B" of said pocket 11B'.

According to an embodiment of the twisting method 100, during the first twisting step 104, said further end portion 2A or 2A' remains outside the further pocket 11B'.

According to an embodiment of method 100, before the first twisting step 104, while said arc of end portions is inserted into said arc R1 of pockets, the further end portion 2A or 2A' is axially offset with respect to the further pocket 11B' by a predetermined angle with respect to twisting axis Z-Z, whereas at the end of first twisting step 104, the further end portion 2A or 2A' is axially aligned with further pocket 11B'.

According to an embodiment of method 100, the step of axially translating 105 comprises a step of positioning the insertion opening 11B" of further pocket 11B' flush or substantially flush with insertion openings 11A" of pockets of said arc R1.

Figure 15:
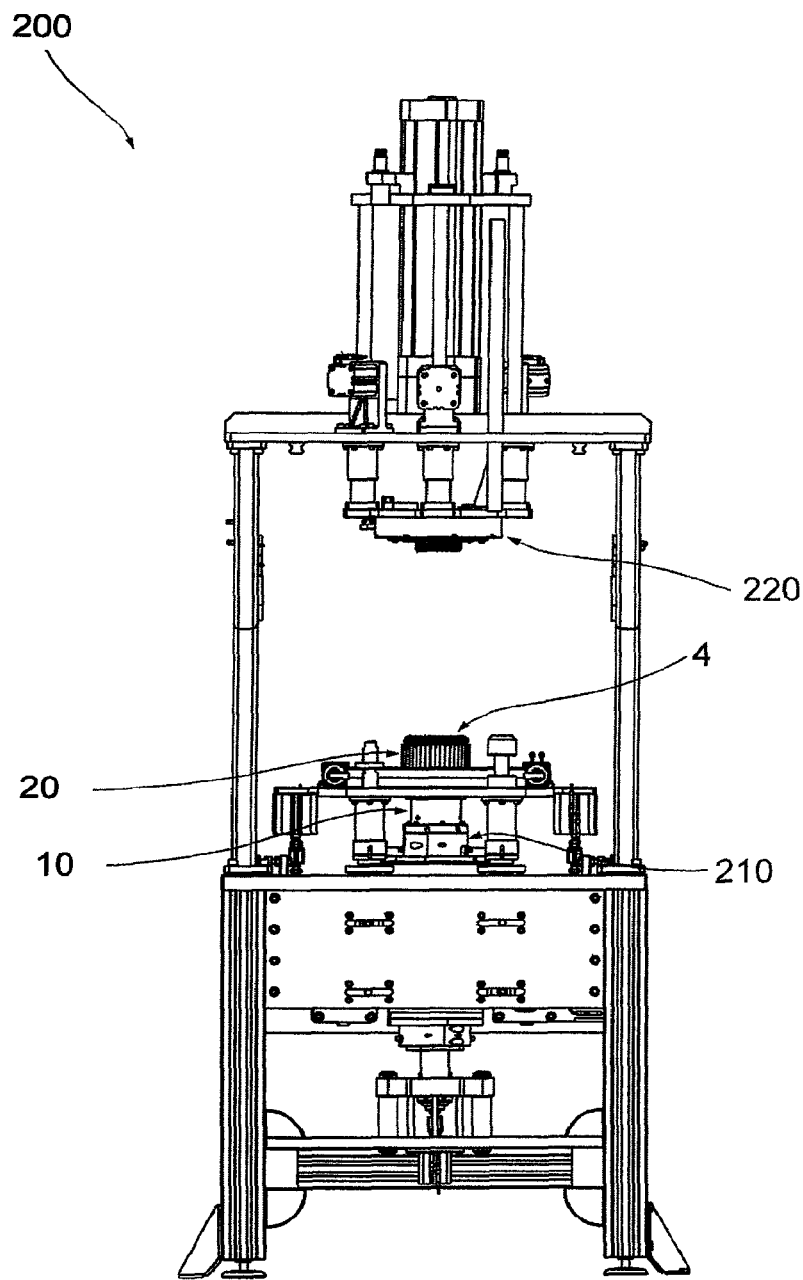
FIG. 15 shows a front plane view of an embodiment of a twisting apparatus comprising the twisting fixture of FIG. 1.

With reference to FIG. 15, it is to be noted that above said method may be carried out, as an example, by means of a twisting apparatus 200, including fixture 10, in which the core 20 may be disposed. In particular, apparatus 200 comprises for example actuating elements 210, which may be coupled to fixture 10 for actuating pocket members and, in particular, said secondary structures. As an example, actuating elements 210 may comprise electrical axes or other servo-fixtures of the hydraulic or pneumatic type. Moreover, apparatus 200 comprises at least one pressure element 220 for engaging and containing connection portions 4, 4' during twisting process.

Based on above description, it is therefore possible to understand how above said twisting method and fixture allow to satisfy above said necessity.

Moreover it is to be noted that the provision of a secondary structure, which is axially slidably mounted with respect to main structure of pocket member, wherein the secondary structure is provided with a plurality of pockets, advantageously facilitates a strengthening of secondary structure with regard to stresses, in particular in a circumferential direction, which may occur during twisting. Again, also the provision of coupling secondary structure to main structure by means of a precision coupling, advantageously facilitates an increases reliability and strength of twisting fixture. Generally speaking, it is to be noted that a twisting fixture according to the present description allows a particularly efficient and reliable twisting, and is at the same time characterized by a relatively simple and robust structure.

Based on the principle of the invention, the ways to carry out the same and its particular embodiments may be subject to ample modifications with respect to the description and illustrations, which are merely illustrative and non limiting, without departing from the scope of the invention, as defined in the appended claims.

The invention claimed is:

1. A twisting fixture for twisting free end portions of bar conductors for a stator or rotor winding of an electrical machine, said twisting fixture comprising:
  at least one pocket member extended about a twisting axis, said pocket member comprising a circular array of pockets having its center on the twisting axis, each pocket of said circular array of pockets being provided with an insertion opening, which is adapted to be passed through by one of said free end portions for inserting such portion into said pocket, the pocket member including:
    (a) a main structure adapted to define an arc of adjacent pockets of said circular array of pockets; and
    (b) a secondary structure movably mounted with respect to the main structure and comprising a further pocket of said circular array of pockets;
  wherein the secondary structure is axially slidably mounted in a direction of the twisting axis (Z-Z) with respect to the main structure.

2. The twisting fixture of claim 1, wherein the secondary structure is slidable with respect to main structure only in the direction of the twisting axis (Z-Z).

3. The twisting fixture of claim 1, wherein the secondary structure is such as to take up:
  an axially backward operating position, wherein the secondary structure defines a recess of the pocket member, and wherein the insertion opening of the further pocket is positioned at a first axial distance from the insertion openings of the pockets of said arc; and
  an axially forward operating position, with respect to said backward position, wherein the insertion opening of said further pocket is positioned at a second axial distance from the insertion openings of the pockets of said arc.

4. The twisting fixture of claim 3, wherein in said forward position, the insertion opening of the further pocket is flush or substantially flush with insertion openings of the pockets of said arc.

5. The twisting fixture of claim 1, wherein the further pocket is positioned adjacent to a pocket of said arc and wherein the pockets of said arc are angularly and uniformly spaced to each other by a predetermined angle with respect to the direction of the twisting axis (Z-Z), the further pocket being angularly spaced from said adjacent pocket by an angle which is different from said predetermined angle.

6. The twisting fixture of claim 1, wherein the secondary structure comprises a plurality of said further pockets.

7. The twisting fixture of claim 1, wherein the secondary structure is coupled to the main structure by means of a precision coupling for allowing said axial sliding in the direction of the twisting axis (Z-Z) of the secondary structure.

8. A twisting apparatus comprising the twisting fixture of claim 1.

9. The twisting fixture of claim 1, wherein the pocket member comprises a plurality of said secondary structures.

10. A twisting fixture for twisting free end portions of bar conductors for a stator or rotor winding of an electrical machine, said twisting fixture comprising:
  at least one pocket member extended about a twisting axis, said pocket member comprising a circular array of pockets being provided with an insertion opening, which is adapted to be passed through by one of said free end portions for inserting such portion into said pocket, the pocket member including:
    (a) a main structure adapted to define an arc of adjacent pockets of said circular array of pockets; and
    (b) a secondary structure axially slidably mounted in a direction of the twisting axis (Z-Z) with respect to the main structure by means of a precision coupling that includes a slide seat defined by two circumferentially opposed guiding walls of the main structure, for allowing said axial sliding in the direction (Z-Z); said secondary structure comprising a further pocket of said circular array of pockets.

* * * * *